US008856399B2

(12) United States Patent
Haramaty

(10) Patent No.: US 8,856,399 B2
(45) Date of Patent: Oct. 7, 2014

(54) SYSTEM AND METHOD FOR DETERMINING NON-FRAGMENTATION FOR COMMUNICATION OF PACKETS

(75) Inventor: Zachy Haramaty, Ramat Gan (IL)

(73) Assignee: PMC Sierra Israel Ltd., Herzlia Pituach (IL)

( * ) Notice: Subject to any disclaimer, the term of this patent is extended or adjusted under 35 U.S.C. 154(b) by 460 days.

(21) Appl. No.: 12/857,589

(22) Filed: Aug. 17, 2010

(65) Prior Publication Data

US 2012/0045203 A1 Feb. 23, 2012

(51) Int. Cl.
G06F 3/00 (2006.01)
H04L 12/841 (2013.01)
H04Q 11/00 (2006.01)

(52) U.S. Cl.
CPC ........ H04L 47/28 (2013.01); H04Q 2011/0064 (2013.01); H04Q 11/0067 (2013.01)
USPC .......................................................... 710/33

(58) Field of Classification Search
USPC .......................................................... 710/33
See application file for complete search history.

(56) References Cited

U.S. PATENT DOCUMENTS

| 5,878,045 | A | * | 3/1999 | Timbs | 370/466 |
|---|---|---|---|---|---|
| 6,138,189 | A | * | 10/2000 | Kalkunte | 710/53 |
| 2003/0137975 | A1 | * | 7/2003 | Song et al. | 370/353 |
| 2007/0064731 | A1 | * | 3/2007 | Mizutani et al. | 370/468 |
| 2008/0175072 | A1 | * | 7/2008 | Norman | 365/189.05 |
| 2008/0181248 | A1 | * | 7/2008 | Haran et al. | 370/412 |
| 2009/0198864 | A1 | * | 8/2009 | Kimura et al. | 710/317 |
| 2010/0157953 | A1 | * | 6/2010 | Christoffersson et al. | 370/336 |
| 2010/0293355 | A1 | * | 11/2010 | Norman | 711/201 |

* cited by examiner

Primary Examiner — Henry Tsai
Assistant Examiner — Aurangzeb Hassan
(74) Attorney, Agent, or Firm — Mark M. Friedman

(57) ABSTRACT

A system and method for determining non-fragmentation for communication of data packets includes generating a plurality of packets and storing in a cell-list at least one cell-value indicating a transmission duration of at least one of the packets in units of cell-size, where the cell-size represents a fixed, predetermined time required to transmit at least a minimum length packet. This facilitates determining non-fragmentation for communication of packets having reduced complexity, lower memory requirements, and shorter processing time than conventional techniques. The complexity is O(1), in contrast to conventional non-fragmentation techniques that have complexities O(N). Corresponding to the reduced complexity, the processing time is shorter than for conventional techniques. Depending on the application, the current embodiment has lower memory requirements than conventional non-fragmentation techniques.

26 Claims, 9 Drawing Sheets

SYSTEM AND METHOD FOR DETERMINING NON-FRAGMENTATION FOR COMMUNICATION OF PACKETS

FIELD OF THE INVENTION

The present embodiment generally relates to data communications, and in particular, it concerns a system and method for determining non-fragmentation for communication of packets.

BACKGROUND OF THE INVENTION

In the field of data communications, an important and often needed function is to determine within a threshold the number of non-fragmented packets ready for transmission from a device. The process of finding the maximum number of non-fragmented packets in a list of packets that fit under a threshold is referred to as "non-fragmentation". In one non-limiting example, determining the non-fragmentation allows a system to perform quality of service (QoS) functions such as shaping on a list of packets. Non-fragmentation is particularly complicated in Ethernet communications because the Ethernet communications specification does not allow transmission of fragmented packets and because Ethernet packets have variable length. On the other hand, non-fragmentation is not complicated in communication systems where transmission of fragmented packets is allowed or in communications such as asynchronous transmission mode (ATM) since ATM packets have fixed lengths.

Background information and the need for non-fragmentation (in the context of EPON ONU devices, both 1G and 10G) can be found in U.S. patent application Number 20080181248 to Haran et al., "Methods for Dynamic Bandwidth allocation and Queue Management in Ethernet Passive Optical Networks". Haran teaches conventional methods for dynamic bandwidth allocation and queue management designed to avoid fragmentation loss and guarantee that a length of grant issued by an optical line terminal (OLT) will match precisely the count of bytes to be transmitted by an optical networking unit (ONU).

Note that in the present document an Ethernet passive optical network (EPON) is often used as a non-limiting example of a system in which non-fragmentation is necessary. In the present context of this document, transmission of quantities of data is generally discussed in terms of bytes, or as is generally done in this field, discussed in the equivalent terms of bandwidth or transmission time.

Referring to FIG. 1, a diagram showing an example of timing of communications in an EPON, a centralized network device (OLT) 414 communicates with one or more user devices (ONUs) 900. In the diagram time progresses from left to right, communications from the OLT to the ONUs are shown above the time line (TIME), and communications from the ONUs to the OLT are shown below the time line. A report R1 from a first ONU notifies the OLT 414 that the first ONU has data to send to the OLT and how much data the first ONU wants to send (known as requested allocation). The OLT sends a gate G1 to the first ONU with a granted allocation (how much data the first ONU is allowed to send) of time starting at T1 at which the first ONU is to send data D1. Similarly, a report R2 from a second ONU notifies the OLT 414 that the second ONU has data to send to the OLT and how much data the second ONU wants to send. The OLT knows the amount of time allocated to the first ONU to send data D1 and can send a gate G2 to the second ONU with a granted allocation of time starting at time T2 at which the first ONU's time allocation will be complete and the second ONU can send data D2.

Referring to FIG. 2, a diagram showing an example of a queue egress process, a plurality of queues in an ONU (SUB-QUEUE 0, SUB-QUEUE 1, SUB-QUEUE 2) contain packets (P1-P14) of varying lengths. When a granted bandwidth allocation is applied as a threshold (THRESHOLD) across the queue equally to all sub-queues, the threshold is sufficient to include the full packets P1, P2, P3, P4, P5, and P6 which are transmitted. Packets P7 and P9 would have to be fragmented to be transmitted, as there is not enough granted allocation in the bandwidth allocation scheme for the entire packets to be transmitted, and hence packets P7 and P9 are not transmitted. The difference between the granted bandwidth and the number of bytes transmitted is wasted bandwidth. In order to avoid wasted bandwidth, a better method of transmission is to determine the non-fragmentation, and request a threshold equal to the number of bytes in the non-fragmented packets.

Referring to FIG. 3, a diagram of a conventional technique for determining non-fragmentation on a single queue, a list 902 of packet lengths is needed. The list of packet lengths 902 is also known as a lengths memory. In the present context, the letter "B" with a number is generally used as a non-limiting example to represent the length of a packet in bytes, and for convenience can also be used to refer to the packet. In the context of the present document, ingress refers to a packet that has been prepared for transmission coming into a module for storage and egress. In the context of the present document, egress refers to a packet going out of a storage module for transmission. Packets 84B, 250B, and 88B have exemplary lengths of 84 Bytes, 250 Bytes, and 88 Bytes, respectively. Time flows from left to right in the direction of the arrow TIME, showing ingress of a first packet 84B into a packet memory (not shown). The length of packet 84B is stored in lengths memory 902 in a first memory location M0, with an association to the location in the packet memory of packet 84B. Similarly, a second packet 250B ingresses into the packet memory (not shown). The length of packet 250B is stored in lengths memory 902 in a second memory location M1. A third packet 88B ingresses into the packet memory (not shown) and the length of packet 88B is stored in lengths memory 902 in memory location M2. A conventional non-fragmentation engine (abbreviated as "NoF( )") crawls the lengths memory starting at a designated memory location, and builds a sum of the list elements (packet lengths) until a given threshold has been exceeded. Once the threshold has been exceeded, the previous sum of the elements is the non-fragmentation results. In a non-limiting example, the given threshold is 400 Bytes, and the NoF( ) starts summing at memory location M0. The sum of packet lengths M0 and M1, shown as SUM1=84 B+250 B=334 B. The NoF( ) continues summing by adding M2 to the current sum, shown as SUM2=334 B+88 B=422 B. 422 Bytes exceeds the threshold of 400 Bytes, so the previous sum of 334 Bytes is used as the NoF( ) result.

Note that the term threshold can be used in different, but related functions. In one context, when an ONU wants to determine NoF( ) for an allocation request, the threshold is the committed bandwidth (Bytes) configured by the service level agreement. In one non-limiting example, the committed service level agreement is 8 Mbps (mega bit per second) which is 1 MB per second (mega byte per second) where in a system of 1000 allocation requests per second the threshold will be 1000 Bytes per second, so the NoF(1000) needs to be determined and sent for an allocation request. In another context, when an ONU is granted an allocation, the allocation grant is the threshold used in determining NoF( ) to know how many packets can be egressed. In one non-limiting example, based on system loading an OLT may grant an allocation of 1000 Bytes to an ONU. The NoF(1000) needs to be determined to know how many packets can be egressed. In a case where an allocation grant to an ONU is the allocation request, the previously determined NoF( ) can be used.

Conventional non-fragmentation engine techniques are limited due to factors such as computational complexity, memory requirements, and processing time. The complexity of conventional non-fragmentation techniques for one queue is O(N), where N is the number of packets in the queue. The memory requirements for the lengths memory can be computed from the memory size allocated for storing packets (PacketsMemSize) divided by the minimum packet size (MinPacketSize):

PacketsMemSize/MinPacketSize=LengthsMemSize

A non-limiting example of conventional non-fragmentation operating characteristics is the case supporting a maximum threshold of 1.3 Mbytes, using a PacketsMemSize of 64 MB, and packet lengths in the range of [84 . . . 2020]. Note these are real numbers of EPON packets with preamble and IPG when supporting basic packets lengths of [64 . . . 2000]. The complexity of this case is the maximum number of packets that can fit within the threshold, calculated by the threshold divided by the minimum packet length, approximately 1.3 MB/84 B=15.5K, meaning the NoF( ) would need to crawl up to 15.5K times, or in other words calculate up to 15.5K sums. A lengths memory needs to be allocated to hold the lengths of all of the packets in the packets memory (in other words the number of elements in the list could maximally be) the PacketsMemSize divided by the minimum packet length, approximately 64 MB/84 B=780K elements (also known as entries). If each element is an 11 bit number, the amount of memory needed for the lengths memory is 780K*11 bits=1.07 MB.

For conventional 1G EPON systems PacketsMemSize per queue is small, so total memory size is small. Requirements for future systems require a larger PacketMemSize, with a corresponding increase in cost. State of the art ASIC memory costs (45 nm process) for a 1.07 MB memory is approximately one USA dollar (SUSD 1).

Calculations typically need to be completed in approximately 1000 clock cycles. For conventional 1G EPON systems the threshold was limited to a maximum of approximately 0.13 MB, requiring approximately 1500 clock cycles, which was acceptable. Using the above exemplary case where 15.5K crawls (sum calculations) are needed, even if 4 elements can be summed per clock cycle, there is not sufficient processing time to perform the necessary calculations.

This above non-limiting example and typical operating characteristics demonstrates the limitations of conventional non-fragmentation techniques. The complexity of O(N) is too big for advanced communication systems, large memory requirements are cost prohibitive to implement, and long processing times are not available for performing the necessary calculations.

There is therefore a need for a system and method for determining non-fragmentation for communication of packets having reduced complexity, lower memory requirements, and shorter processing time.

SUMMARY

According to the teachings of the present embodiment there is provided a method for transmitting data, including the steps of: generating a plurality of packets; storing in a first cell-list at least one cell-value indicating a transmission duration of at least one of the packets in units of cell-size; and transmitting at least one of the plurality of data packets based on the first cell-list.

In an optional embodiment, the first cell-list includes at least one cell, each the at least one cell-value being stored in a respective one of the at least one cells to indicate how many units of the cell-size are required to transmit the packet.

In another optional embodiment, at least one cell-value is stored in the respective at least one cell by steps including: aligning the packet with a most recently stored cell-value in the first cell-list; calculating, based on a size of the packet, the at least one cell value including how many full cells and how much of a partial cell are required to transmit the packet; and storing a token cell-value for each of the full cells and the calculated partial cell cell-value in respective cells of the cell-list.

In another optional embodiment, the cell-size represents a time required to transmit a minimum length packet, and wherein each the at least one cell-value is stored in the respective at least one cell by steps including: providing a remainder-in indicating a portion of the cell-size available for a current input cell from the plurality of cells; providing a write-pointer indicating which cell from the plurality of cells to write the cell-value; providing the packet-size of a current packet from the plurality of packets; decreasing the packet-size by the remainder-in; determining the current input cell by dividing the packet-size by the cell-size then rounding up; marking cells from the cell indicated by the write pointer to the cell before the current input cell as being non-ending cells; updating the write-pointer to indicate the current input cell; marking the current input cell with the cell-value based on the current input cell, the packet-size, and the cell-size; and adjusting the remainder-in by subtracting the cell-value from the cell-size.

In another optional embodiment, the cell-size is greater than a time required to transmit a minimum length packet, and wherein each the at least one cell-value is stored in the respective at least one cell by steps including: providing a reminder-in indicating a portion of the cell-size available for a current input cell from the plurality of cells; and comparing the remainder-in to the size of a current packet, and if the size of the current packet is less than the remainder-in, decreasing the remainder-in by the size of the current packet.

In another optional embodiment, the method further includes: providing a second cell-list with the cell-size representing the time required to transmit a minimum length packet; removing at least one of the cell-values from the first cell-list and storing the removed cell-values in the second cell-list; and removing at least one of the values from the second cell-list when the corresponding packet is transmitted.

In another optional embodiment, the method further includes providing a threshold of a maximum time allowed for transmitting packets; and calculating, using the threshold with the first cell-list, a non-fragmentation value indicating which of the packets can be sent.

In another optional embodiment, calculating includes aligning the threshold with an oldest stored cell-value in the first cell-list; and calculating the non-fragmentation value based on determining the most recently stored cell-value that is equal to or less than the threshold.

In another optional embodiment, calculating includes: dividing the threshold by the cell-size then rounding down to determine a current cell from the plurality of cells; checking the cell-value of the current cell to determine if the value is an indication of an ending cell, and if the checking fails to find an indication of an ending cell, determining a new current cell from the plurality of cells to check by going down one cell and repeating the current step; comparing the threshold to the current cell's cell-value, and if the threshold is insufficient to transmit the current cell's corresponding packet, determining a new current cell by going down one cell and repeating the previous step; determining the non-fragmentation based on the current cell, the cell-value of the current cell, and the cell-size, thereby providing the maximum number of non-fragmented packets less than the threshold; and the threshold to account for the non-fragmentation.

An optional embodiment further includes removing at least one of the cell-values from the first cell-list when at least one respective corresponding packet is transmitted.

In another optional embodiment, the removing is effected by steps including: providing a threshold of the maximum time allowed for transmitting packets; aligning the threshold with an oldest stored cell-value in the first cell-list; and removing the cell-values from the oldest stored cell-value to the most recently stored cell-value that is equal to or less than the threshold.

BRIEF DESCRIPTION OF FIGURES

The embodiment is herein described, by way of example only, with reference to the accompanying drawings, wherein.

DETAILED DESCRIPTION

The principles and operation of the system and method according to the present embodiment may be better understood with reference to the drawings and the accompanying description. The present embodiment is a system and method for determining non-fragmentation for communication of packets. In the described embodiment, the conventional use of a lengths memory to store the lengths of packets has been replaced with an innovative storage of packet ends in same-sized cells. Packets are not stored by their length, in contrast, packets are stored by their transmission duration. The time required to transmit a packet is quantized into one or more values associated with the packet, and each of the values is stored in a same-sized cell. As is generally done in this field, bytes can be used as an equivalent representation of transmission duration. While a variety of conventional techniques exist for encoding data in fixed-sizes (packets, cells, or sequences) a feature of the present embodiment is the use of fixed-sized cell encoding for pure packet length lists. The transmission duration of a packet is stored in units of cell-size, where the cell-size represents a fixed, predetermined time required to transmit at least a minimum length packet. In some implementations, fractional units of cell-size can be used. The current embodiment facilitates determining non-fragmentation for communication of packets, having reduced complexity, lower memory requirements, and shorter processing time than conventional techniques. The method of the current embodiment has a complexity $O(1)$, in contrast to conventional non-fragmentation techniques that have complexities $O(N)$. Corresponding to the reduced complexity, the processing time is shorter than for conventional techniques. Depending on the application, the current embodiment has lower memory requirements than conventional non-fragmentation techniques. In a typical case (detailed below) the current embodiment can lower the memory requirements to approximately 63% of conventional memory requirements. Corresponding to lowering memory requirements, are lowered memory costs.

Figure 4:
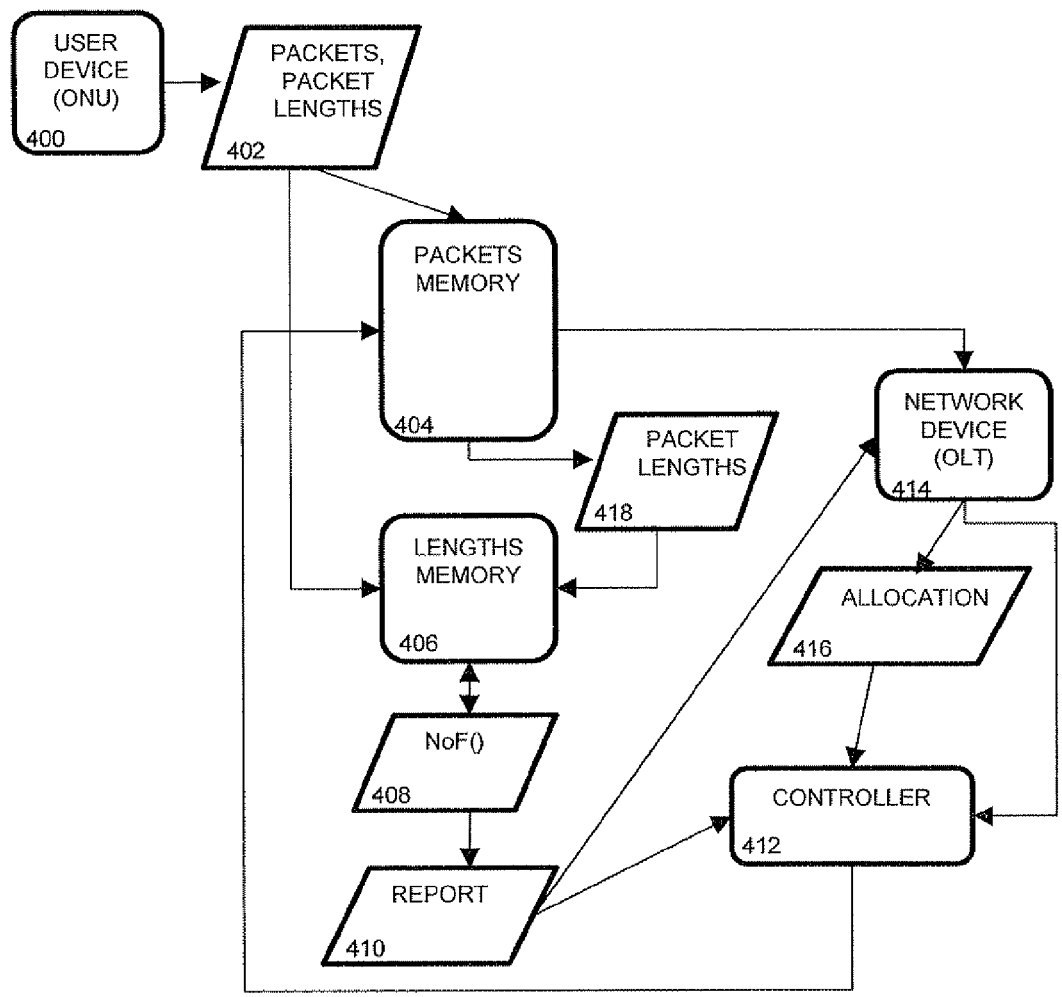
FIG. 4, an implementation of a system that sends packets between a user device and a network device.

Referring to FIG. 4, an implementation of a system that sends packets between a user device and a network device, a user device 400 (for example an optical networking unit—ONU) has a queue containing one or more sub-queues. Note that for clarity, this description often uses Ethernet passive optical network (EPON) components as non-limiting examples for communications systems and components. It should be noted that this method is not limited to EPON implementations, and can be used with other communications systems and for general processing to determine non-fragmentation. A variety of queue implementations and storage module implementations are known in the art and the implementation chosen will depend on the application. A preferred queue implementation includes a packets memory 404 and a lengths memory 406, which are logically separate. Common implementations of user devices include memory (404, 406), processors (including controller 412), and networking systems, in which case the user device of block 400 is a logical device within the physical device. Depending on the application, these functions can be implemented as separate components. In the general diagram of FIG. 4, the components are shown separately for clarity. Based on this description, other options for allocation of hardware, firmware, software, and functionality can be implemented by one skilled in the art.

User device 400 sends packets 402 to a packets memory 404 and the corresponding lengths of the packets 402 to a lengths memory 406. The lengths memory 406 is accessed by a non-fragmentation algorithm 408 [abbreviated "NoF( )"] to determine how much bandwidth (how many bytes) need to be requested from a centralized dynamic arbitration scheme on a network device. The non-fragmentation algorithm 408 generates a report 410 that includes how much bandwidth the user device needs in order to transmit the non-fragmented packets that are in the queue ready for transmission. Note that a report can contain alternate bandwidth requests and/or more than one bandwidth request. In a case where the NoF( ) is not calculated, a report includes the total amount of data in the queue. In another case the report contains both a bandwidth request for the total amount of data in the queue and a bandwidth request for NoF( ) data, in which case the NoF( ) is calculated. In another case, the report includes a bandwidth request based on bandwidth shaping of the communications link. Based on this description, one skilled in the art will be able to implement a report appropriate to a specific application.

The report 410 is sent to a local controller 412 and to a network device 414 (for example an optical line transmission equipment—OLT). The centralized network device is commonly connected to a plurality of user devices, receiving reports from the user devices and deciding on allocations of bandwidth for each user device. The network device 414 sends an allocation 416 to the controller 412. The controller 412 compares the allocation 416 to the report 410 to determine how many packets can be sent. In the case where the allocation is equal to the report, the controller 412 signals the queue that the already-determined packets can be sent. In the case where the allocation is greater than the report, the controller 412 can access the lengths memory 406 or signal the non-fragmentation algorithm 408 (connections not shown in the diagram for clarity) to determine which additional non-fragmented packets can be sent. Similarly, in the case where the allocation is less than the report, the controller 412 accesses and/or signals the appropriate other system components to determine which non-fragmented packets can be sent. When the determined packets are sent from the packets memory 404 to the network device 414, the lengths memory 406 is updated to remove the lengths of the sent packets 418 and corresponding reference to the sent packets.

Figure 1:
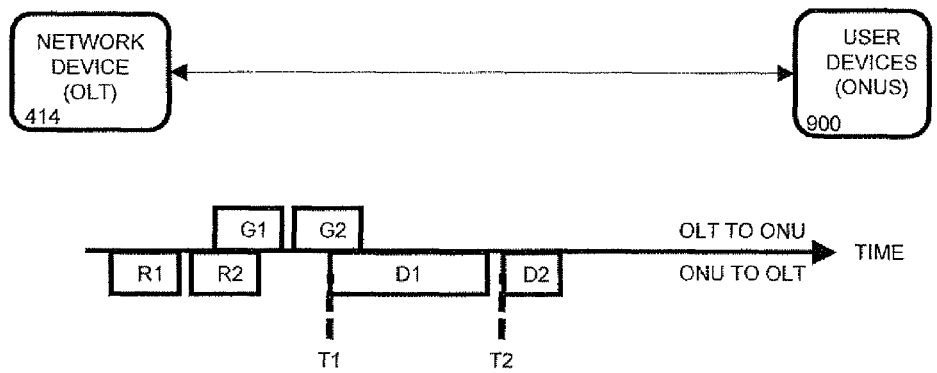
FIG. 1, a diagram showing an example of timing of communications in an EPON.
Figure 2:
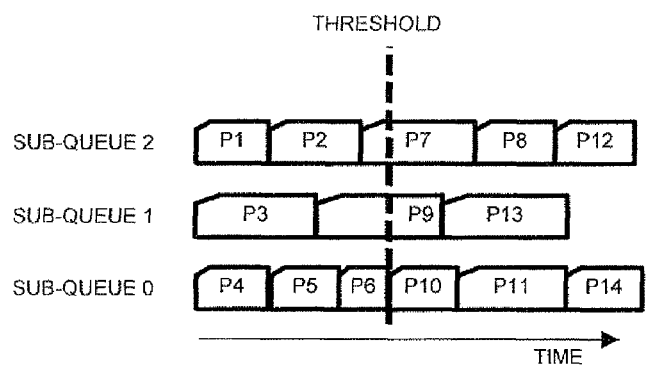
FIG. 2, a diagram showing an example of a queue egress process.
Figure 3:
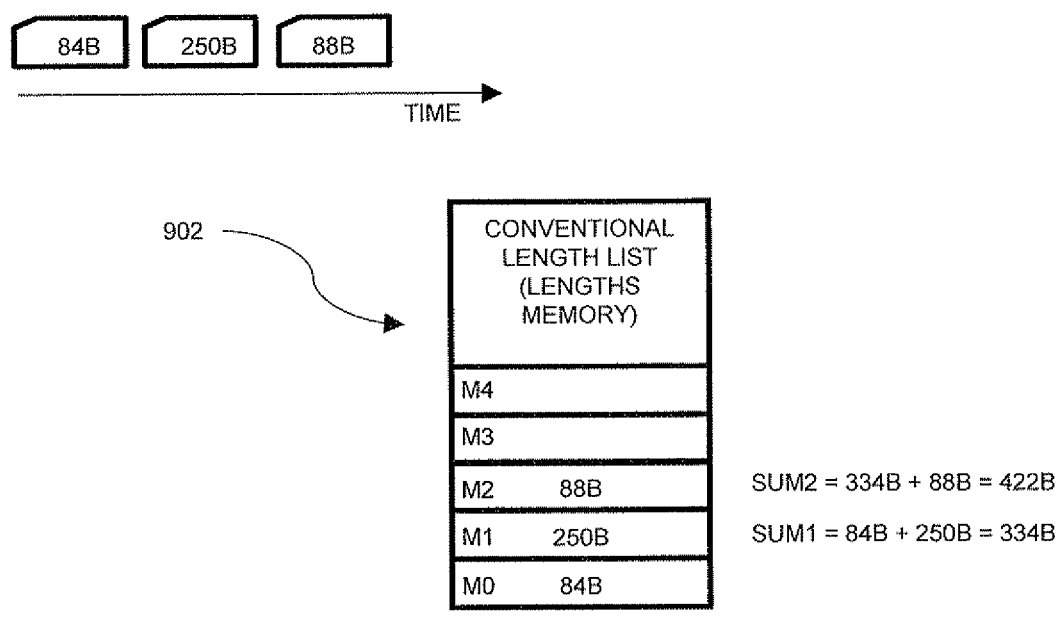
FIG. 3, a diagram of a conventional technique for determining non-fragmentation on a single queue.
Figure 5A:
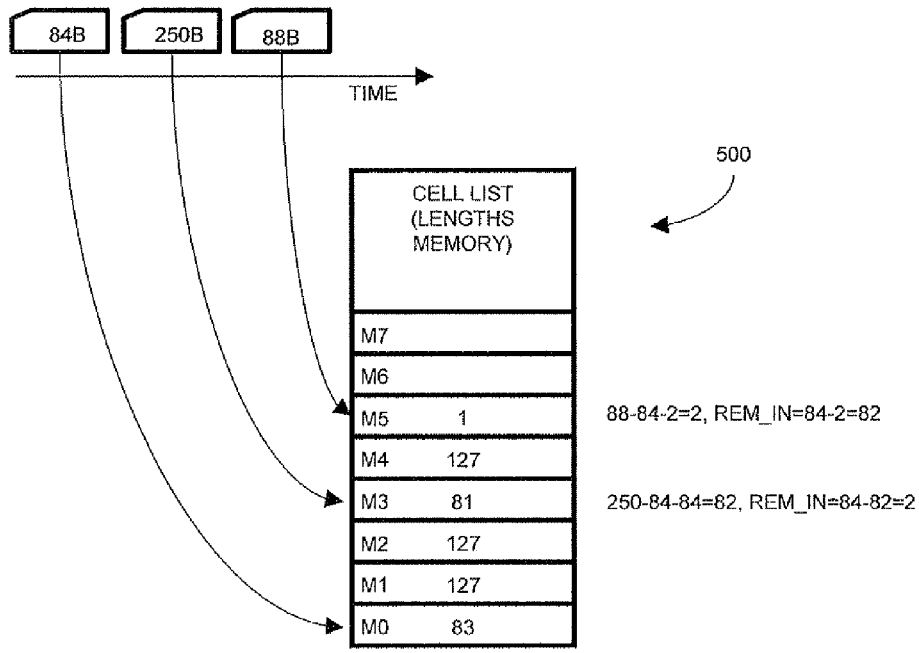
FIG. 5A, a diagram of packet length ingress into a cell list.

Referring to FIG. 5A, a diagram of packet length ingress into a cell list 500, the conventional use of a lengths memory to store the lengths of packets has been replaced with an innovative storage of packet ends in same-sized cells. As a guide to the reader, one implementation of the method will be generally described, and then a detailed description of an implementation of an algorithm for this method is described below. As described previously in reference to FIG. 3, in a conventional lengths memory when a first packet 84B ingresses, the length of the packet (84 B) is stored in a first memory location M0, with an association to the location in the packets memory of packet 84B, and when a second packet 250B ingresses the length of the packet (250 B) is stored in a second memory location M1. In contrast, in the present embodiment, in cell list 500 packets are not stored by their length, rather packets are stored by their transmission duration. To differentiate the function of the memory locations (M0, M1, M2 . . . ) they are generally referred to in the present document as cells. All cells are the same size. The size of the cells is determined by the minimum packet length of the application. Designating a cell-size that is equal or less than the minimum packet length insures that no more than one packet will have a packet end in a cell. Each cell stores the end point of the first packet end. If there is no packet end in a cell then the cell is flagged as no-packet-end. Note that the cell list contains only non-fragmented packets, so in a case where the entire cell list (all of the queued packets) is transmitted, the transmission is of non-fragmented packets.

In a non-limiting example, a minimum sized Ethernet packet with a preamble and a minimum IPG is 84 Bytes, so the cells are designated to hold packet ends in the range of [0 . . . 83]. If a cell has no-packet-end, it can be flagged with a designated token, or out of range value, for example 127. When a first packet 84B ingresses, the length of packet 84B is equal or less than the cell-size (84 Bytes), so the packet end is stored in a first cell M0 (as 83, which is length 84 in the range [0 . . . 83]), with an association to the location in the packets memory of packet 84B. When a second packet 250B ingresses, the length of packet 250B is greater than the cell-size, so the packet end needs to be calculated. The length of time required to transmit the 250 Bytes of packet 250B is 250−84−84=two minimum sized packets plus 82 Bytes (250=84+84+82). Cells M1 and M2 are flagged with no-packet-end token (127) and the packet end (81) is stored in cell M3, with an association to the location in the packets memory of packet 250B. To assist in ingressing the next packet, a remainder (REM_IN) is calculated of the cell-size minus the last packet end, in this case REM_IN=84−82=2. When a third packet 88B ingresses, the length of packet 88B is larger than the cell-size plus the remainder (84+2=86) so cell M4 is flagged with no-packet-end (127) and the packet end (88−84−2=1) is stored in cell M5. A new remainder is calculated REM_IN=84−2=82.

Figure 5B:
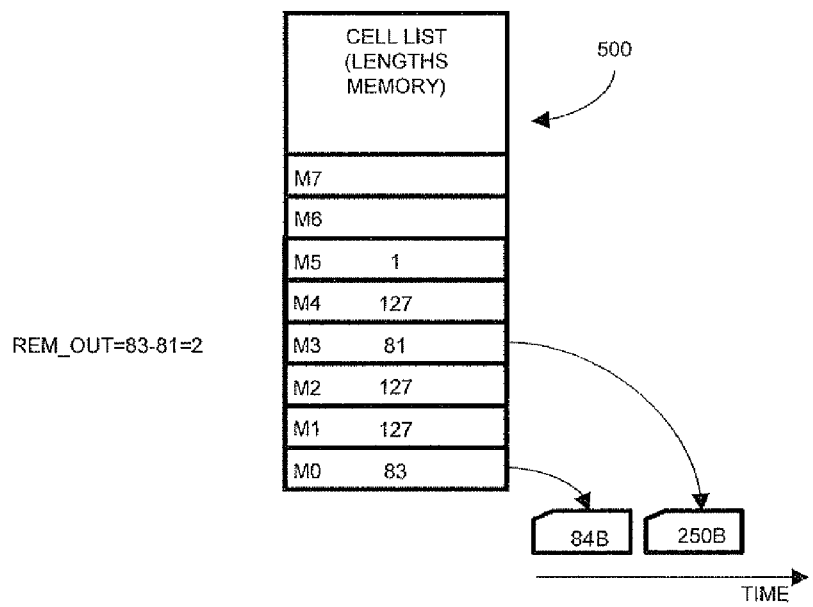
FIG. 5B, a diagram of packet length egress from a cell list.

Referring to FIG. 5B, a diagram of packet length egress from a cell list, determining the non-fragmentation requires reading only the last cells under the threshold to find a packet end. In a non-limiting example, a 400 Byte allocation is granted and a REM_OUT pointer is at the beginning of cell M0 (memory location 0). The 400 Byte allocation is added to REM_OUT to determine the maximum amount of data that can be sent. In this case, the 400 Byte allocation falls in cell M4 (400=84+84+84+84+64). Cell M4 does not contain a packet end (contains no-packet-end flag 127), so the previous cell M3 is checked. Cell M3 does contain a packet end (81), so the full packets associated with cells M0 to M3 are sent for transmission. The number of bytes to be transmitted is calculated using the number of full cells (3), cell-size (84), and the packet end (81) information (3*84+81+1=the number of bytes to transmit). To assist in egressing the next packet, the REM_OUT pointer is updated with the amount of data still to be sent from cell M3, in this case REM_OUT=83−81=2. Cells M0 to M3 do not have to be cleared of packet end information, as the appropriate pointers are used to know where to access the cell list, and the cells will be overwritten when needed. Note that this example is of an implementation where finding the non-fragmentation has been combined with egressing cells.

Expanding the current example, in a case where the communications specification has packets of size [84 . . . 2020], a maximum threshold (allocation grant) of 1.3 Mbytes, and the ONU has a packets memory size of 64 Mbytes, then the corresponding lengths memory has a size of 780K cells. Given a granted allocation of 840,400 Bytes (10,000 cells*84 Bytes+400 Bytes to make this expansion mate with the current example), if the packets memory has less than 840,400 Bytes to send, all of the data can be transmitted. If the packets memory has more than 840,400 Bytes of data to transmit, the NoF( ) has to be determined. Since the cell list is based on packet transmission duration, the NoF( ) can skip the first 840,336 Bytes (10004 cells*84 Bytes) and start looking for a packet end that will result in a NoF( ) less than the granted allocation.

A non-limiting example using typical operating characteristics demonstrates the reduced complexity, lower memory requirements, and shorter processing time of the current implementation in contrast to conventional techniques for determining non-fragmentation for communication of packets. Given Ethernet packets of size [84 . . . 2020], a maximum sized Ethernet packet is stored in the cell list as (2020 Bytes/ 84 Bytes~) 25 cells. Hence, finding a non-fragmentation point requires reading no more than 26 cells, in contrast to conventional techniques (as in the above example) that can require reading up to 15.5K entries. Calculation of how many Bytes to skip before beginning to search for a packet end is independent of the number of cells in the lengths memory, the resulting complexity is reduced to O(1). A lengths memory needs to be allocated to hold a cell list of transmission durations of all of the packets in the packets memory, which in this case is the same size as needed for a conventional non-fragmentation algorithm (PacketsMemSize divided by the minimum packet length=64 MB/84 Byes=) 780K cells. However, each cell has a width of 7 bits (for storing up to 84+1 values) instead of 11 bits (for storing up to 2020 values) requiring only (7 bits*780 K~) 0.68 Mbytes instead of 1.07 Mbytes, lowering the memory requirement to approximately (7 bits/11 bits) 63% of conventional memory requirements. Corresponding to lowering memory requirements are lowered memory costs from approximately $USD 1 to $USD 0.63.

Figure 6:
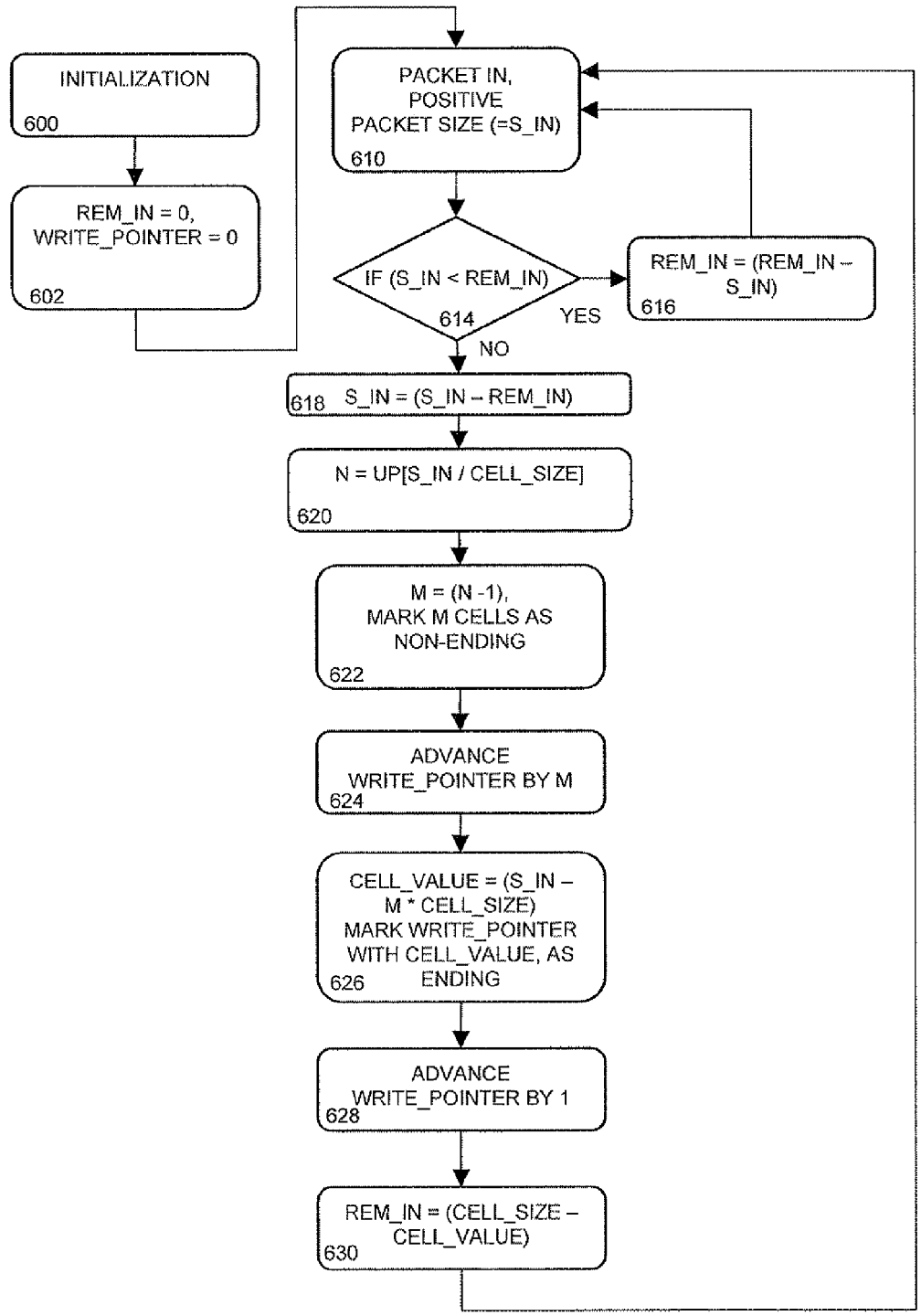
FIG. 6, a flowchart of a method for packet ingress to a cell list.

Referring to FIG. 6, a flowchart of a method for packet ingress to a cell list, the algorithm starts with initialization 600. An ingress remainder REM_IN indicates how many bytes are still available for a cell. A write pointer WRITE_POINTER indicates where a next entry will be written to in a cell list. REM_IN and WRITE_POINTER are initialized 602 to starting values (shown in the flowchart as starting values of zero).

When ingressing a packet, S_IN is initially set 610 to the positive number of bytes in the ingressing packet. During execution of the ingress algorithm, S_IN is re-used (for example in block 618) as an intermediate value for the calculations, where S_IN is in units of bytes. In an optional implementation providing "extra-compression", described below, in block 614 if S_IN is less than REM_IN, then in block 616 S_IN is subtracted from REM_IN and ingressing of the next packet is begun in block 610. In block 614 if S_IN is greater than REM_IN then in block 618 REM_IN is subtracted from S_IN giving a result of how many more bytes need to be handled. The variables N and M are intermediate values used for calculation and are in units of cells. CELL_SIZE is a parameter of the system that has been pre-determined for the application. In block 620, the number of cells needed to handle the remaining bytes (S_IN) is calculated by N=UP[S_IN/CELL_SIZE], where UP indicates a round-up function. In block 622 the number of non-ending cells are determined M=(N−1), and the non-ending cells are marked as non-ending. In block 624, the cell to be written to is indicated by advancing WRITE_POINTER by M. The value to be written to a cell is calculated in block 626 as CELL_VALUE=(S_IN M*CELL_SIZE), and written to the cell indicated by WRITE_POINTER, which marks the cell as an ending cell. In block 628 WRITE_POINTER is advanced by 1. In block 630 REM_IN is updated by calculating REM_IN=(CELL_SIZE−CELL_VALUE), in preparation for ingressing the next packet in block 610.

Figure 7:
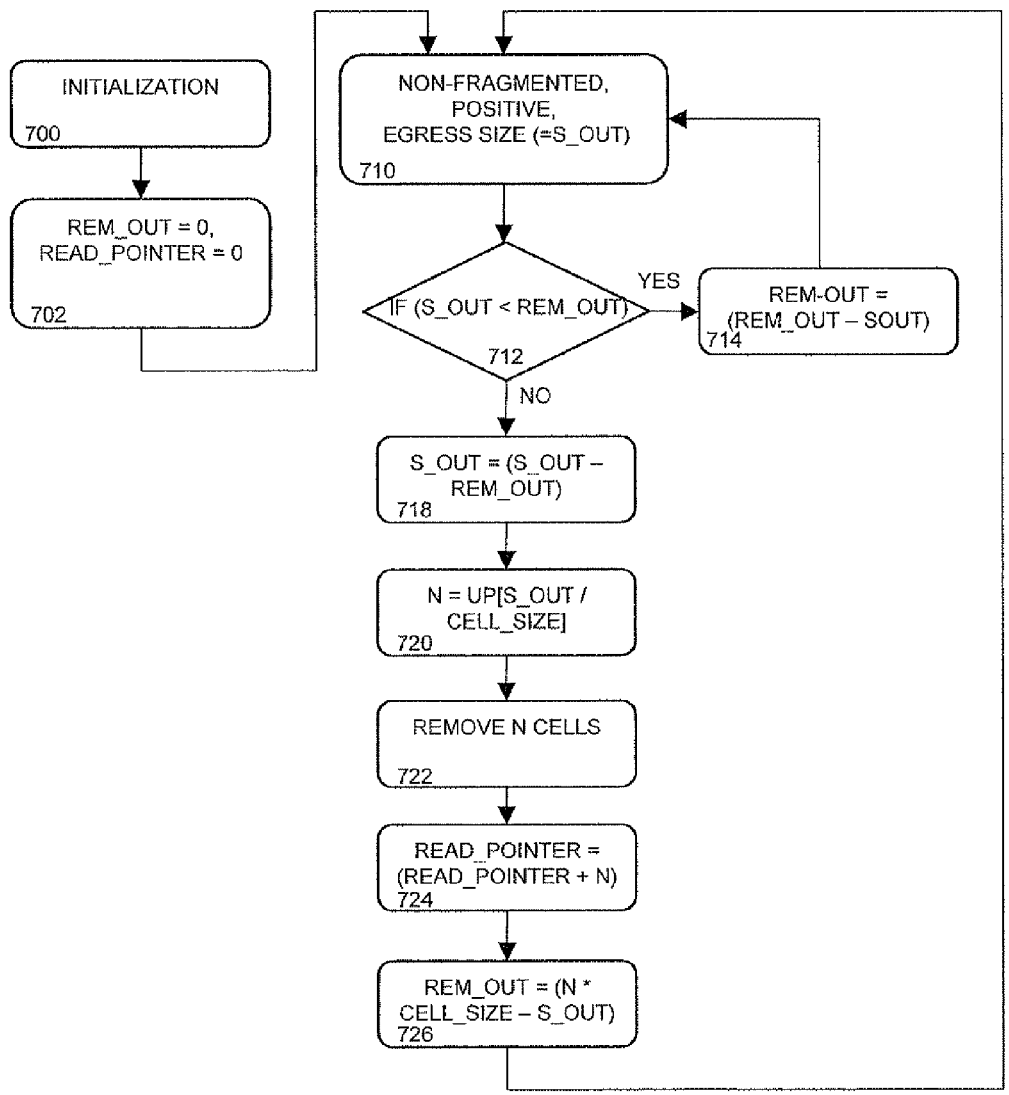
FIG. 7, a flowchart of a method for packets egress from a cell list.

Referring to FIG. 7, a flowchart of a method for packets egress from a cell list, the notation described in reference to FIG. 6 is used, unless described otherwise. The algorithm starts with initialization 700. An egress remainder REM_OUT indicates how many bytes are still being referred to by a cell. A read pointer READ_POINTER indicates where a next entry will be read from in a cell list. REM_OUT and READ_POINTER are initialized 702 to starting values (shown in the flowchart as starting values of zero).

When egressing packets, S_OUT is initially set 710 to the number of non-fragmented bytes to be egressed. During execution of the egress algorithm, S_OUT is re-used (for example in block 718) as an intermediate value for the calculations, where S_OUT is in units of bytes. In an optional implementation providing "extra-compression", described below, in block 712 if S_OUT is less than REM_OUT, then in block 714 S_OUT is subtracted from REM_OUT and egressing of the next packet is begun in block 710. In block 712 if S_OUT is greater than REM_OUT then in block 718, the egress remainder REM_OUT is subtracted from S_OUT, S_OUT=(S_OUT REM_OUT). In block 720, the number of cells to be removed from the cell list is calculated as N=UP[S_OUT/CELL_SIZE] and N cells are removed from the cell list in block 722. In block 724 READ_POINTER is updated to indicate where the next entry will be read from in the cell list, READ_POINTER=(READ_POINTER+N), and in block 726 REM_OUT is updated to indicate how many bytes are being referred to by the cell indicated by READ_POINTER, REM_OUT=(N*CELL_SIZE−S_OUT). REM_OUT is the number of unused bytes which are not pointed at by any cell, or which were pointed to by the previously read cell. REM_OUT is in units of bytes.

Figure 8:
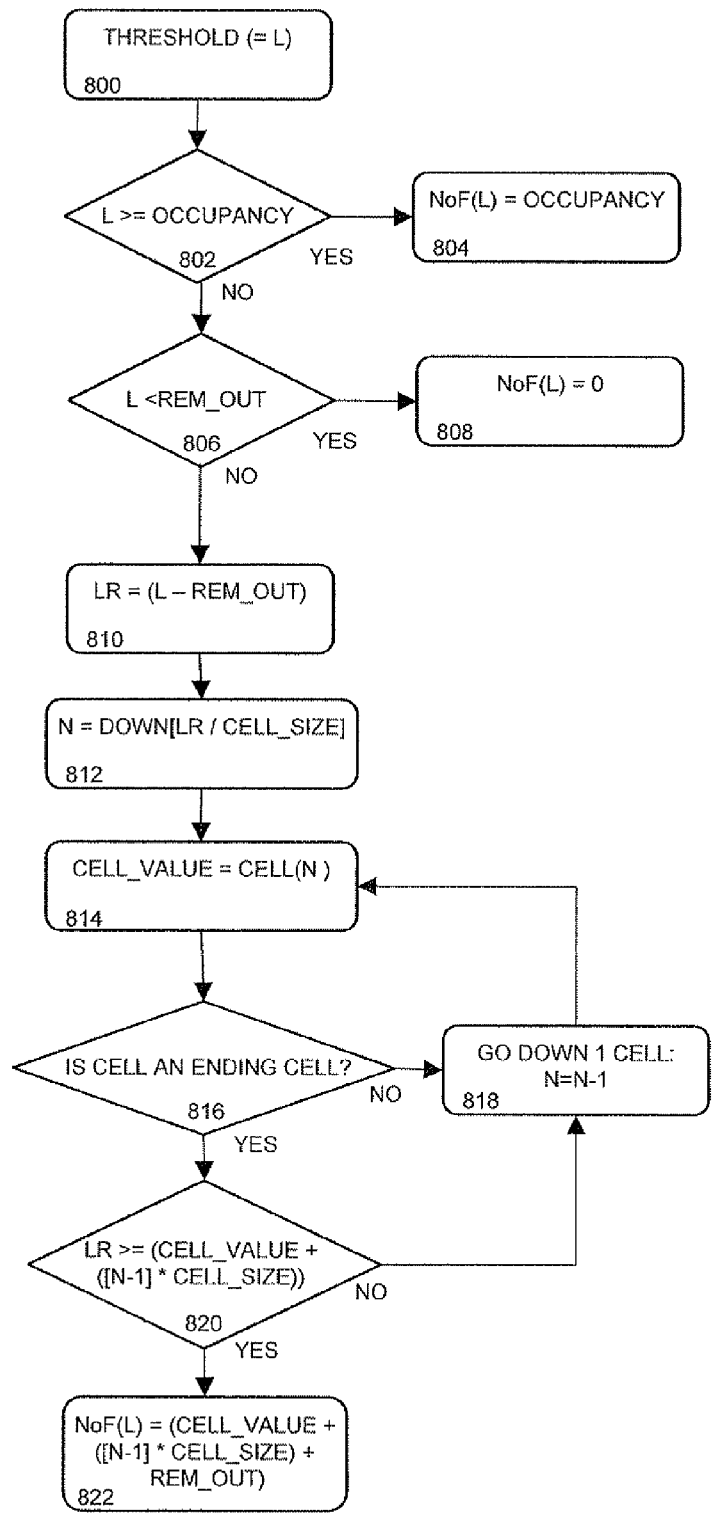
FIG. 8, a flowchart of a method for determining non-fragmentation [NoF( )] using a cell list.

Referring to FIG. 8, a flowchart of a method for determining non-fragmentation [NoF( )] using a cell list, the notation described in reference to FIG. 6 is used, unless described otherwise. The algorithm starts 800 with a given threshold L as a parameter for which to find non-fragmentation. In block 802, if the given threshold L is greater than the amount of data waiting to be transmitted, shown as OCCUPANCY, then the NoF( ) is set to the OCCUPANCY as shown in block 804 (and the algorithm is finished). In block 806, if the given threshold L is smaller than the remainder, shown as REM_OUT, then the NoF( ) is set to zero as shown in block 808 (and the algorithm is finished). If the OCCUPANCY is greater than the threshold L, then the NoF( ) must be calculated. In block 810, LR is set to the number of bytes that can be egressed from yet unread cells, by calculating the threshold L minus the egress remainder REM_OUT. LR is an intermediate value in units of bytes. Because of the structure of the cell list, the algorithm is able to skip directly to a cell N close to the NoF(L) result by a single calculation of N DOWN[LR/CELL_SIZE], where DOWN indicates a round-down function, shown in block 812. In block 814, the value in the cell CELL_VALUE indicated by N is read, and in block 816, the CELL_VALUE is checked to see if the CELL_VALUE indicates an ending cell. If CELL_VALUE does not indicate an ending cell, the algorithm goes down one cell, shown in block 818 as and algorithm loops back to check the newly indicated CELL_VALUE in block 814. In block 816, if the CELL_VALUE indicates an ending cell, then in block 820 LR is checked to see if LR is greater than the number of bytes to be egressed if the current CELL_VALUE is used. If the result of block 820 is "no", then the algorithm continues with block 818 to go down a cell. If the result of block 820 is "yes", then the algorithm continues with block 822, setting the NoF (L) to the CELL_VALUE plus the skipped cells (N*CELL_SIZE) plus the egress remainder REM_OUT.

For additional clarity, the example described in reference to FIG. 5A is now described with the method of FIG. 6. In block 602 REM_IN and WRITE_POINTER are initialized to starting values of zero. When first packet 84B ingresses S_IN is initially set 610 to 84. "Extra-compression", is not being used, and in block 614 S_IN (84) is greater than REM_IN (0) so in block 618 REM_IN is subtracted from S_IN (84−0) giving a result of how many more bytes need to be handled. CELL_SIZE has been pre-determined to be 84 Bytes for this example. In block 620, the number of cells needed to handle the remaining bytes (S_IN=84) is calculated by (N=UP[S_IN/CELL_SIZE]=UP[84/84]=1), where UP indicates a round-up function. In block 622 the number of non-ending cells are determined (M=N−1=1−1=0), and zero non-ending cells are marked as non-ending. In block 624, the cell to be written to is indicated by advancing WRITE_POINTER by M (WRITE_POINTER=WRITE_POINTER+M=0+0=0). The value to be written to (or in other algorithms read from) a cell is calculated in block 626 as CELL_VALUE=(S_IN−M*CELL_SIZE=84−0*84=84), and 83 (which is length 84 in the range [0 . . . 83]) is written to the cell indicated by WRITE_POINTER (0=cell M0), which marks the cell as an ending cell. In block 628 the WRITE_POINTER is advanced by 1 (0+1=1=cell M1). In block 630 REM_IN is updated by calculating REM_IN=(CELL_SIZE−CELL_VALUE=84−84=0), in preparation for ingressing the next packet in block 610.

Returning to block 610 when second packet 250B ingresses S_IN is set to 250. "Extra-compression", is not being used, and in block 614 S_IN (250) is greater than REM_IN (0) so in block 618 REM_IN is subtracted from S_IN (250−0) giving a result of how many more bytes need to be handled. In block 620, the number of cells needed to handle the remaining bytes (S_IN=250) is calculated by (N=UP[S_IN/CELL_SIZE]=UP[250/84]=3). In block 622 the number of non-ending cells are determined (M=N−1=3−1=2), and two non-ending cells are marked as non-ending (Cells M1 and M2 are flagged with no-packet-end (127)). In block 624, the cell to be written to is indicated by advancing WRITE_POINTER by M (WRITE_POINTER=WRITE_POINTER+M=1+2=3). The value to be written to a cell is calculated in block 626 as CELL_VALUE=(S_IN−M*CELL_SIZE=250−2*84=82), and 81 (which has been adjusted for the range [0 . . . 83]) is written to the cell indicated by WRITE_POINTER (3=cell M3), which marks the cell as an ending cell. In block 628 the WRITE_POINTER is advanced by 1 (3+1=4=cell M4). In block 630 REM_IN is updated by calculating REM_IN=(CELL_SIZE CELL_VALUE=84−82=2), in preparation for ingressing the next packet in block 610.

Returning again to block 610 when a third packet 88B ingresses S_IN is set to 88. "Extra-compression", is not being used, and in block 614 S_IN (88) is greater than REM_IN (2) so in block 618 REM_IN is subtracted from S_IN (88−2=86) giving a result of how many more bytes need to be handled. In block 620, the number of cells needed to handle the remaining bytes (S_IN=86) is calculated by (N=UP[S_IN/CELL_SIZE]= UP[86/84]=2). In block 622 the number of non-ending cells are determined (M=N−1=2−1=1), and one non-ending cell is marked as non-ending (Cells M4 is flagged with no-packet-end (127)). In block 624, the cell to be written to is indicated by advancing WRITE_POINTER by M (WRITE_POINTER=WRITE_POINTER+N=4+1=5). The value to be written to a cell is calculated in block 626 as CELL_VALUE=(S_IN M*CELL_SIZE=86−1*84=2), and 1 (which has been adjusted for the range [0 . . . 83]) is written to the cell indicated by WRITE_POINTER (5=cell M5), which marks the cell as an ending cell. In block 628 the WRITE_POINTER is advanced by 1 (5+1=6=cell M6). In block 630 REM_IN is updated by calculating REM_IN=(CELL_SIZE CELL_VALUE=84−2=82), in preparation for ingressing the next packet in block 610.

For additional clarity, the cell list described in reference to FIG. 5B is now used to describe the method of FIG. 7. REM_OUT and READ_POINTER are initialized 702 to starting values of zero. S_OUT is initially set 710 to the number of non-fragmented bytes to be egressed, in this example, 334 Bytes. In block 712, S_OUT is smaller than REM_OUT so in block 718, the egress remainder REM_OUT (0) is subtracted from S_OUT, S_OUT=(S_OUT REM_OUT=334−0=334). In block 720, the number of cells to be removed from the cell list is calculated as N=UP [S_OUT/CELL_SIZE=334/84=4] and N (4) cells are removed from the cell list in block 722 (cells M0 through M3). In block 724 READ_POINTER is updated to indicate where the next entry will be read from in the cell list, READ_POINTER=(READ_POINTER+N=0+4=M4), and in block 726 REM_OUT is updated to indicate how many extra bytes are being referred to by the cell indicated by READ_POINTER (REM_OUT=N*CELL_SIZE−S_OUT32 4*84−334=2).

Returning to block 710 when a second allocation is received, S_OUT is set 710 to the number of non-fragmented bytes to be egressed, in this second allocation, 88 Bytes. In block 712, S_OUT is smaller than REM_OUT so in block 718, the egress remainder REM_OUT (2) is subtracted from S_OUT, S_OUT=(S_OUT REM_OUT=88−2=86). In block 720, the number of cells to be removed from the cell list is calculated as N=UP[S_OUT/CELL_SIZE=86/84=2] and N (2) cells are removed from the cell list in block 722 (cells M4 through M5). In block 724 READ_POINTER is updated to indicate where the next entry will be read from in the cell list, READ_POINTER (READ_POINTER+N=4+2=M6), and in block 726 REM_OUT is updated to indicate how many extra bytes are being referred to by the cell indicated by READ_POINTER (REM_OUT=N*CELL_SIZE−S_OUT=2*84−86=82).

For additional clarity, the cell list described in reference to FIG. 5B is now used to describe the method of FIG. 8. The algorithm starts 800 with a given threshold L (400) as a parameter for which to find non-fragmentation. In block 802, since the OCCUPANCY (422) is greater than the threshold L (400) and in block 806 since the threshold L (400) is smaller than REM_OUT then the NoF(L)=NoF(400) must be calculated. In block 810, LR is set to the number of bytes that can be egressed from yet unread cells, by calculating the threshold L minus the egress remainder REM_OUT (LR=L−REM_OUT=400−0=400). As described above, because of the structure of the cell list, the algorithm is able to skip directly to a cell N close to the NoF(L) result by a single calculation of N=DOWN[LR/CELL_SIZE=DOWN[400/84]=4], shown in block 812. In block 814, the value in the cell CELL_VALUE (marked with the no-packet-end token) indicated by N (4=M4) is read. Then in block 816, the cell is checked to see if the cell is an ending cell. Because the cell is an ending cell, in block 818 N is decreased by 1, thus providing 1=(4−1)=3. In block 814, the value in the cell CELL_VALUE (81 in a range of [0 . . . 83], which is 82) indicated by N (3=M3) is read, and in block 816, the CELL_VALUE is checked to see if the CELL_VALUE indicates an ending cell (81 is an indicator of an ending cell). In block 820 LR (400) is checked to see if LR is greater than the number of bytes to be egressed ([N−1]*CELL_SIZE)+CELL_VALUE [4−1]*84+82=334) so LR (400) is greater than 334, and the algorithm continues with block 822, setting NoF(L)=(CELL_VALUE+([N−1]*CELL_SIZE)+REM_OUT 82+([4−1]*84+0)=334). In summary of this example, the algorithm returns a non-fragmentation NoF(400) of 334, which is a threshold sufficient for transmitting the two non-fragmented packets 84B and 250B.

Note that as described above, the information in a cell list, also known as a lengths memory, is associated with packets stored in a packets memory. When a packet ingresses to the packet memory, the length of the packet is ingressed to the lengths memory. When packets are egressed, the information in the lengths memory is used to egress the associated packets. An assumption is that only full non-fragmented packets are egressed. Techniques for storing and removing data from associated memories is known in the art, and based on this description, one skilled in the art will be able to implement a technique appropriate for the application.

Figure 9:
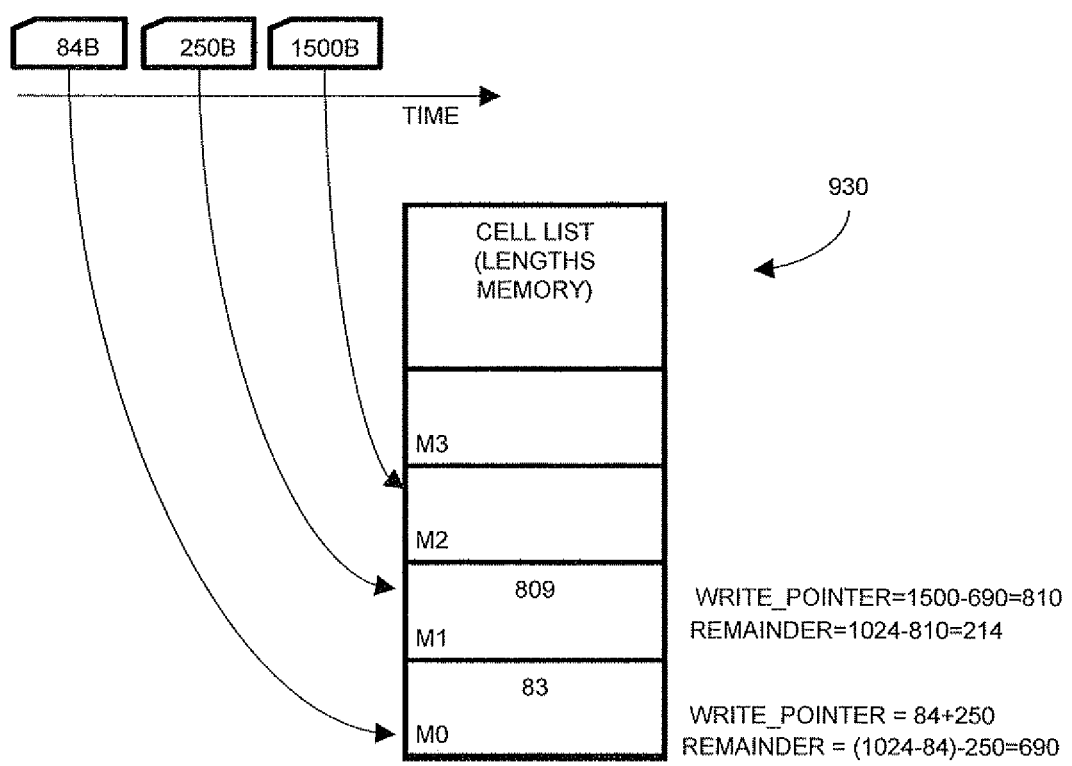
FIG. 9, a diagram of packet length ingress into a cell list when "extra compression" is used.

In an optional embodiment, the above described method and system can provide "extra compression" where the amount of memory required is greatly reduced, and hence the memory cost is greatly reduced, while providing a non-optimal non-fragmentation [NoF( )] result. Referring to FIG. 9, a diagram of packet length ingress into a cell list 930 when "extra compression" is used, the cell-size (also notated as CellSize or CELL_SIZE) is much larger than the minimum packet length. Packet lengths ingress into the cell list similar to the description of FIG. 5A, but only the first packet ending in a cell is marked in the cell.

In a non-limiting example, a cell-size of 1024 is used for Ethernet packets of minimum length 84 Bytes. In this case, more than one packet can end in a cell, although as stated, only the first packet ending in a cell is marked in the cell. When a first packet 84B ingresses, the length of packet 84B is equal or less than the cell-size (1024 Bytes), so the packet end is stored in a first cell M0 as 83 (which is length 84 in the range [0 . . . 1023]), with an association to the location in the packets memory (not shown) of packet 84B. The REMAINDER (1024−84=940) and WRITE_POINTER (0+84=84) are updated (not shown). When a second packet 250B ingresses, the length of packet 250B is less than the REMAINDER, so the length of the second packet is added to the WRITE_POINTER (=84+250) and the REMAINDER updated (=94−250=690). Note that the packet end for second packet 250B is not stored. When a third packet 1500B ingresses, the length of packet 1500B is greater than the REMAINDER, so we need to go to the next cell to store the packet end. The packet end for the third packet 1500B, is (1500−REMAINDER=1500−690=) 810, which is stored in a second cell M1 as 809 (which is length 810 in the range [0 . . . 1023]). As before, the REMAINDER is updated (REMAINDER=1024−810=214) and the WRITE_POINTER is updated (=810).

Packet lengths egress from the cell list similar to the description of FIG. 5B, but only when a sufficient grant allocation is received to include the first packet ending that has been marked in a cell and the unmarked cells since the previous packet egress. To assist in understanding this egress, in the current example, if a grant allocation is received of (84 B+250 B+1500 B=) 1834 Bytes or greater, then all three packets can be sent. If a grant allocation is received of less than 1834 Bytes, but greater than 84 Bytes, then only the first packet (84 B) can be sent. After sending the first packet, the grant request will be for (250+1500=) 1750 Bytes. If a grant allocation is received of less than 1750 Bytes, then no packets will be sent. If a grant allocation of 1750 Bytes or greater is received, then packet two (250 B) and packets three (1500 B) can be sent.

This "extra compression" greatly reduces the amount of memory required, as each cell in the cell list stores a single value, but the number of cells required is reduced. The amount of memory needed for the lengths memory (cell list) is [(PacketsMemSize/CellSize)*CellWidth]. In a non-limiting example consistent with some previous examples, compared to a cell-size of 84 Bytes, the number of cells is reduced by 1024/84, although on a width of 11 bits (10 bits of data plus ibit for tag of no-packet-end), so for a 64 MB PacketMemSize the amount of lengths memory required is [(64 MB/1024)*11 bits]~0.9 MB corresponding to a memory cost of approximately $USD 0.09. This is in contrast to the above example requiring a memory size of 1.07 MB at a cost of approximately $USD 1. Note that in an implementation where a cell-size of 1024 is used, the width reduces to 11 bits, with a corresponding savings in the amount of lengths memory required and associated cost of the memory. The described example, using a cell-size of 1024, was chosen to provide a clear explanation.

A characteristic of the above-described extra-compression method is that the non-fragmentation [NoF( )] result is non-optimal, with an error of up to the cell-size. In particular, it is desirable to mitigate the non-optimal NoF( ) result of the extra-compression method in cases of low queue occupancy (lightly loaded queues), for example when queue occupancy is less than one CellSize.

Figure 10:
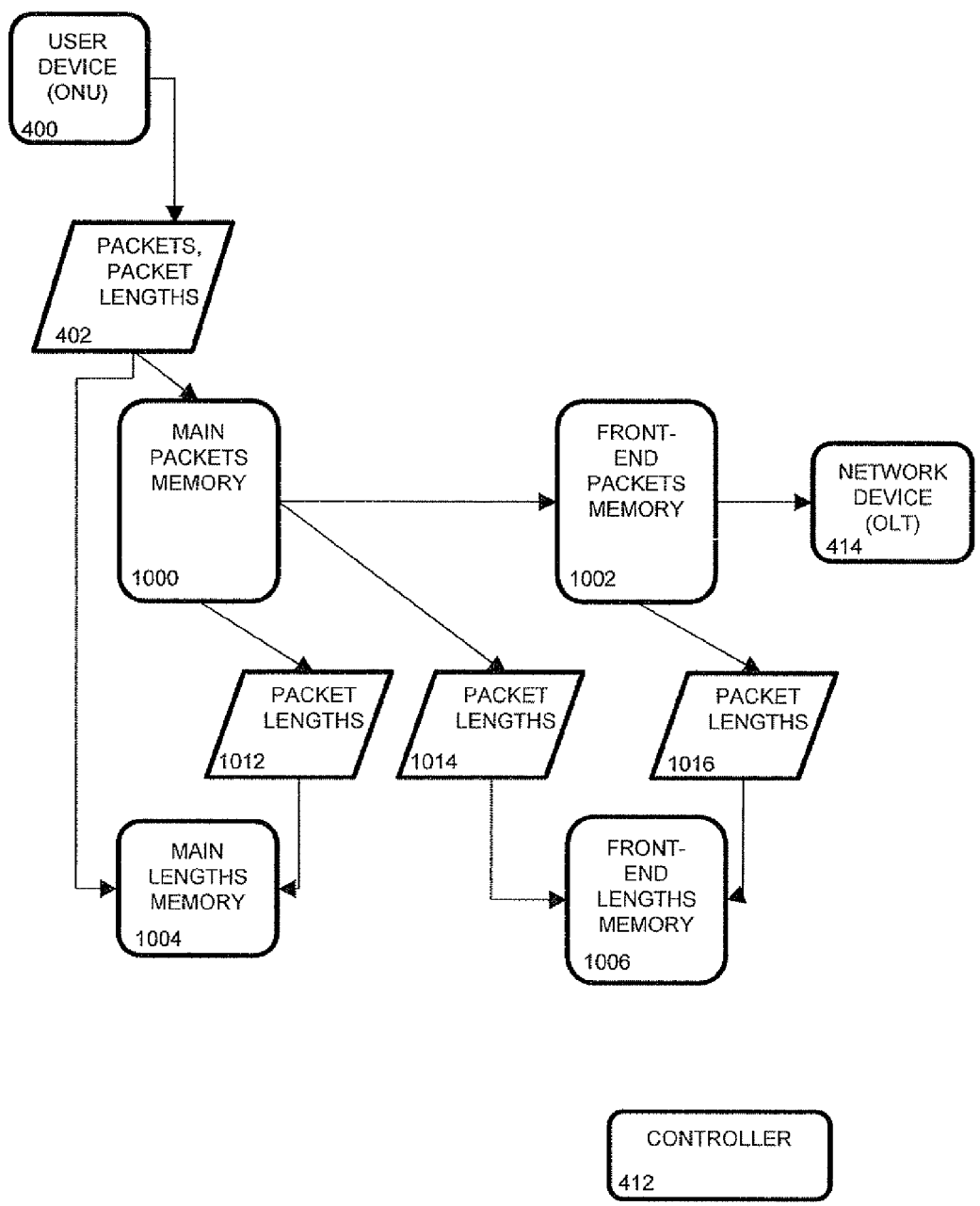
FIG. 10, an implementation of a portion of an extra-compression system that sends packets between a user device and a network device.

In an optional embodiment, a split queue is used to mitigate the non-optimal NoF( ) result of the extra-compression method. FIG. 10 shows an implementation of a portion of an extra-compression system that sends packets between a user device and a network device. From FIG. 4, packets memory 404 is implemented as a main packets memory 1000 and a front-end packets memory 1002, with corresponding lengths memory 406 implemented as a main lengths memory 1004 and a front-end lengths memory 1006. The front-end packets memory 1002 can be implemented with a relatively small amount of memory, as compared to the amount of memory needed for the main packets memory 1000, approximately a few CellSizes.

The main packets memory 1000 functions as described for extra-compression, providing a non-optimal non-fragmentation result. When the front-end packets memory 1002 has memory available, packets are transferred from the main packets memory 1000 to the front-end packets memory 1002. Transferred packets are parsed, and the length of the transferred packet 1014 is sent to the front-end lengths memory 1006. The front-end packets and lengths memories function as previously described in relation to FIGS. 6, 7, and 8 for non-fragmentation, providing an optimal non-fragmentation result. Packet lengths 402, 1012, 1014, and 1016 are calculated, added, and subtracted in accordance with the above descriptions. Controller 412 uses information from the main lengths memory 1004 and front-end lengths memory 1006 to combine the non-fragmentation results and determine which packets to send from the main packets memory 1000 and a front-end packets memory 1002 (connections not shown for simplicity).

It should be noted that the above-described examples, numbers used, and exemplary calculations are to assist in the description of this embodiment. Inadvertent typographical and mathematical errors should not detract from the utility and basic advantages of the invention.

It will be appreciated that the above descriptions are intended only to serve as examples, and that many other embodiments are possible within the scope of the present invention as defined in the appended claims.

What is claimed is:
1. A method for transmitting data, comprising the steps of:
a) generating a plurality of data packets;
b) quantizing a transmission duration of at least one of said plurality of data packets into at least one cell-value, said cell-value indicating a transmission duration in units of cell-size, wherein said cell-size is a pre-determined sized unit of transmission duration of at least a time required to transmit a minimum length data packet; and
c) storing said at least one cell-value in a first cell-list.
2. The method of claim 1 wherein said first cell-list includes at least one cell, each said at least one cell-value being stored in a respective one of said at least one cell to indicate how many units of said cell-size are required to transmit said at least one of said plurality of data packets.
3. The method of claim 2 wherein each said at least one cell-value is stored in said respective one of said at least one cell by steps including:
(i) aligning one of said plurality of data packets with a most recently stored cell-value in said first cell-list;
(ii) calculating, based on a size of said one of said plurality of data packets, said at least one cell value including how many full cells and how much of a partial cell are required to transmit said one of said plurality of data packets; and (iii) storing a token cell-value for each of said full cells and the calculated partial cell cell-value in respective cells of said cell-list.

4. The method of claim 2 wherein each said at least one cell-value is stored in said respective at least one cell by steps including:
   (i) providing a remainder-in indicating a portion of said cell-size available for a current input cell from said plurality of cells;
   (ii) providing a write-pointer indicating which cell from said plurality of cells to write said cell-value;
   (iii) providing the data packet-size of a current data packet from said plurality of data packets;
   (iv) decreasing said data packet-size by said remainder-in;
   (v) determining said current input cell by dividing said data packet-size by said cell-size then rounding up;
   (vi) marking cells from the cell indicated by said write pointer to the cell before said current input cell as being non-ending cells;
   (vii) updating said write-pointer to indicate said current input cell;
   (viii) marking said current input cell with said cell-value based on said current input cell, said data packet-size, and said cell-size; and
   (ix) adjusting said remainder-in by subtracting said cell-value from said cell-size.

5. The method of claim 2 wherein said cell-size is greater than a time required to transmit a minimum length data packet, and wherein each said at least one cell-value is stored in said respective at least one cell by steps including:
   (i) providing a reminder-in indicating a portion of said cell-size available for a current input cell from said plurality of cells; and
   (ii) comparing said remainder-in to the size of a current data packet, and if said size of said current data packet is less than said remainder-in, decreasing said remainder-in by said size of said current data packet.

6. The method of claim 5 further comprising the step of:
   (i) providing a second cell-list with the cell-size representing the time required to transmit a minimum length data packet;
   (ii) removing at least one of the cell-values from said first cell-list and storing the removed cell-values in said second cell-list; and
   (iii) removing at least one of the values from said second cell-list when said corresponding data packet is transmitted.

7. The method of claim 2 further including the steps of:
   d) providing a threshold of a maximum time allowed for transmitting data packets; and
   e) calculating, using said threshold with said first cell-list, a non-fragmentation value indicating which of the data packets can be sent.

8. The method of claim 7 wherein said calculating includes:
   (i) aligning said threshold with an oldest stored cell-value in said first cell-list; and
   (ii) calculating said non-fragmentation value based on determining the most recently stored cell-value that is equal to or less than said threshold.

9. The method of claim 7 wherein said calculating includes:
   (i) dividing said threshold by said cell-size then rounding down to determine a current cell from said plurality of cells;
   (ii) checking the cell-value of said current cell to determine if the value is an indication of an ending cell, and if said checking fails to find an indication of an ending cell, determining a new current cell from said plurality of cells to check by going down one cell and repeating the current step;
   (iii) comparing said threshold to said current cell's cell-value, and if said threshold is insufficient to transmit said current cell's corresponding data packet, determining a new current cell by going down one cell and repeating the previous step;
   (iv) determining said non-fragmentation based on said current cell, the cell-value of said current cell, and said cell-size, thereby providing the maximum number of non-fragmented data packets less than said threshold; and
   (v) adjusting said threshold to account for said non-fragmentation.

10. The method of claim 2 further including the step of:
    d) removing at least one of the cell-values from said first cell-list when at least one respective corresponding data packet is transmitted.

11. The method of claim 10 wherein said removing is effected by steps including:
    (i) providing a threshold of the maximum time allowed for transmitting data packets;
    (ii) aligning said threshold with an oldest stored cell-value in said first cell-list; and
    (iii) removing the cell-values from said oldest stored cell-value to the most recently stored cell-value that is equal to or less than said threshold.

12. The method of claim 10 wherein said removing is effected by steps including:
    (i) providing a reminder-out indicating a portion of said cell-size to be removed from said first cell-list;
    (ii) providing a read-pointer indicating which cell from said plurality of cells to read said cell-value;
    (iii) providing an allocation of time allowed for data packets to be transmitted;
    (iv) decreasing said allocation by said remainder-out;
    (v) determining a current output cell by dividing said allocation by said cell-size then rounding up;
    (vi) removing cells between the cell indicated by said read pointer to said current output cell;
    (vii) updating said read-pointer to indicate said current output cell; and
    (viii) adjusting said remainder-out based on said current output cell, said cell-size, and said allocation.

13. The method of claim 1 wherein said generating of a plurality of data packets is by an optical networking unit (ONU).

14. The method of claim 1 wherein said transmitting of said at least one of said plurality of data packets is via an Ethernet passive optical network (EPON).

15. The method of claim 1 wherein said plurality of data packets are stored separately from said first cell-list.

16. The method of claim 1 further comprising the step of:
    d) transmitting said at least one of said plurality of data packets based on said first cell-list.

17. A system for transmitting data, comprising:
    a) a data packet source configured to provide a plurality of data packets; and b) a processing system containing one or more processors, said processing system being configured to:
  (i) accept said plurality of data packets from said data packet source;
  (ii) generate a first cell list;
  (iii) quantize a transmission duration of at least one of said plurality of data packets into at least one cell-value, said cell-value indicating a transmission duration in units of cell-size, wherein said cell-size is a pre-determined sized unit of transmission duration of at least a time required to transmit a minimum length data packet; and
  (iv) store in said first cell-list said at least one cell-value.

18. The system of claim 17 wherein said processing system is further configured to generate said first cell-list which includes at least one cell, each said at least one cell-value being stored in a respective one of said at least one cells to indicate how many units of said cell-size are required to transmit said at least one of said plurality of data packets.

19. The system of claim 18 wherein said processing system is further configured to store each said at least one cell-value in said respective at least one cell by steps including:
  a) aligning one of said plurality of data packets with a most recently stored cell-value in said first cell-list;
  b) calculating, based on a size of said one of said plurality of data packets, said at least one cell value including how many full cells and how much of a partial cell are required to transmit said one of said plurality of data packets; and
  c) storing a token cell-value for each of said full cells and the calculated partial cell cell-value in respective cells of said cell-list.

20. The system of claim 18 wherein said processing system is further configured to:
  (v) generate a second cell list with the cell-size being less than or equal to the size of said plurality of data packets;
  (vi) remove at least one of the values from said first cell-list and store the removed values in said second cell-list; and
  (vii) remove at least one of the values from said second cell-list when said corresponding one of said plurality of data packets is transmitted.

21. The system of claim 18 wherein said processing system is further configured to calculate, using a given threshold with said first cell-list, a non-fragmentation value indicating which of said plurality of data packets can be sent.

22. The system of claim 18 wherein said processing system is further configured to remove at least one of said at least one cell-value from said first cell-list when corresponding at least one of said plurality of data packets is transmitted.

23. The system of claim 17 wherein said data packet source is an optical networking unit (ONU).

24. The system of claim 17 wherein said data packet transmitter is configured to transmit said plurality of data packets on an Ethernet passive optical network (EPON).

25. The system of claim 17 wherein said plurality of data packets are stored separately from said first cell-list.

26. The system of claim 17 further comprising:
  c) a data packet transmitter configured to transmit said plurality of data packets based on first cell-list.

* * * * *